UNITED STATES PATENT OFFICE.

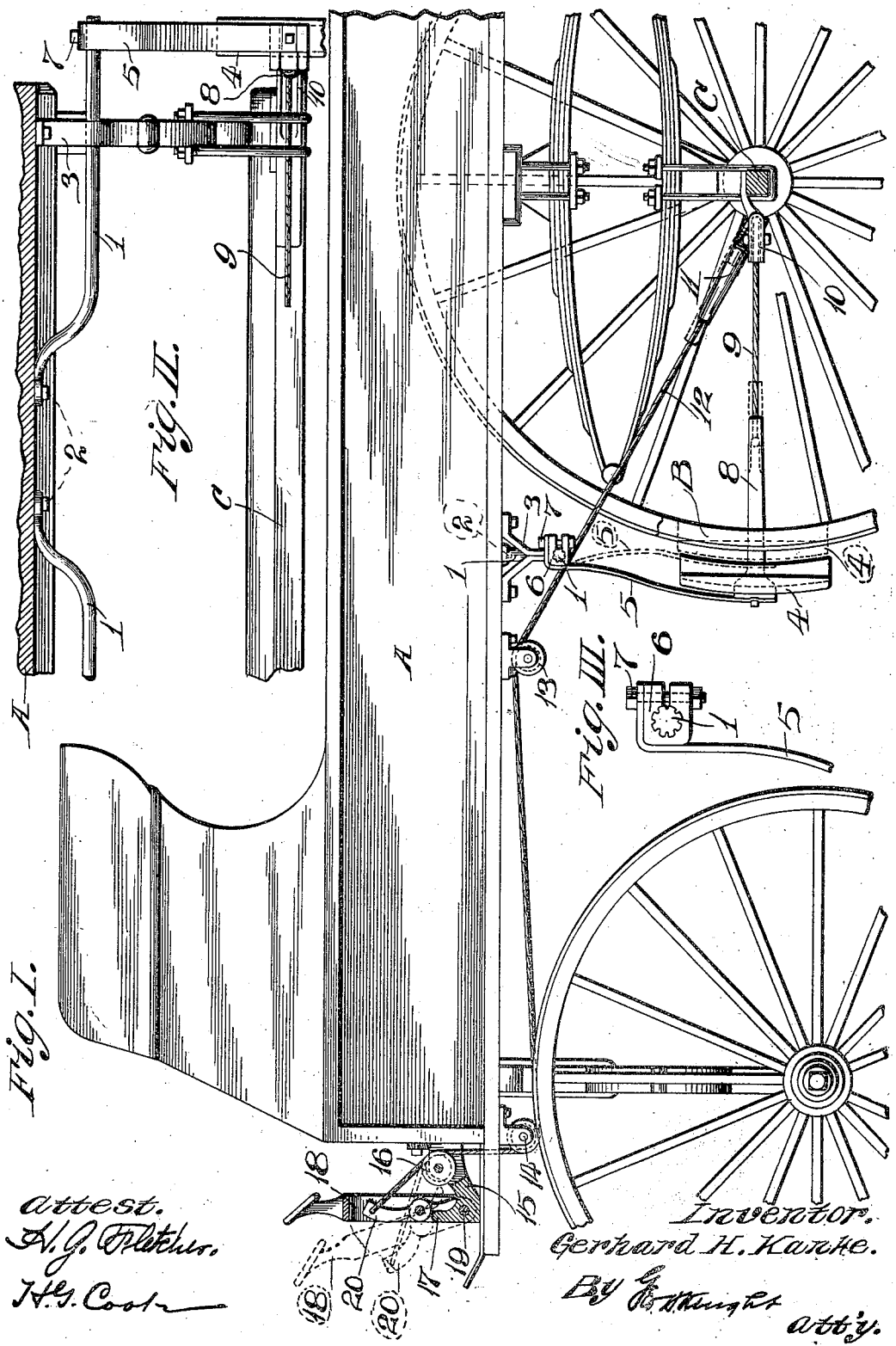

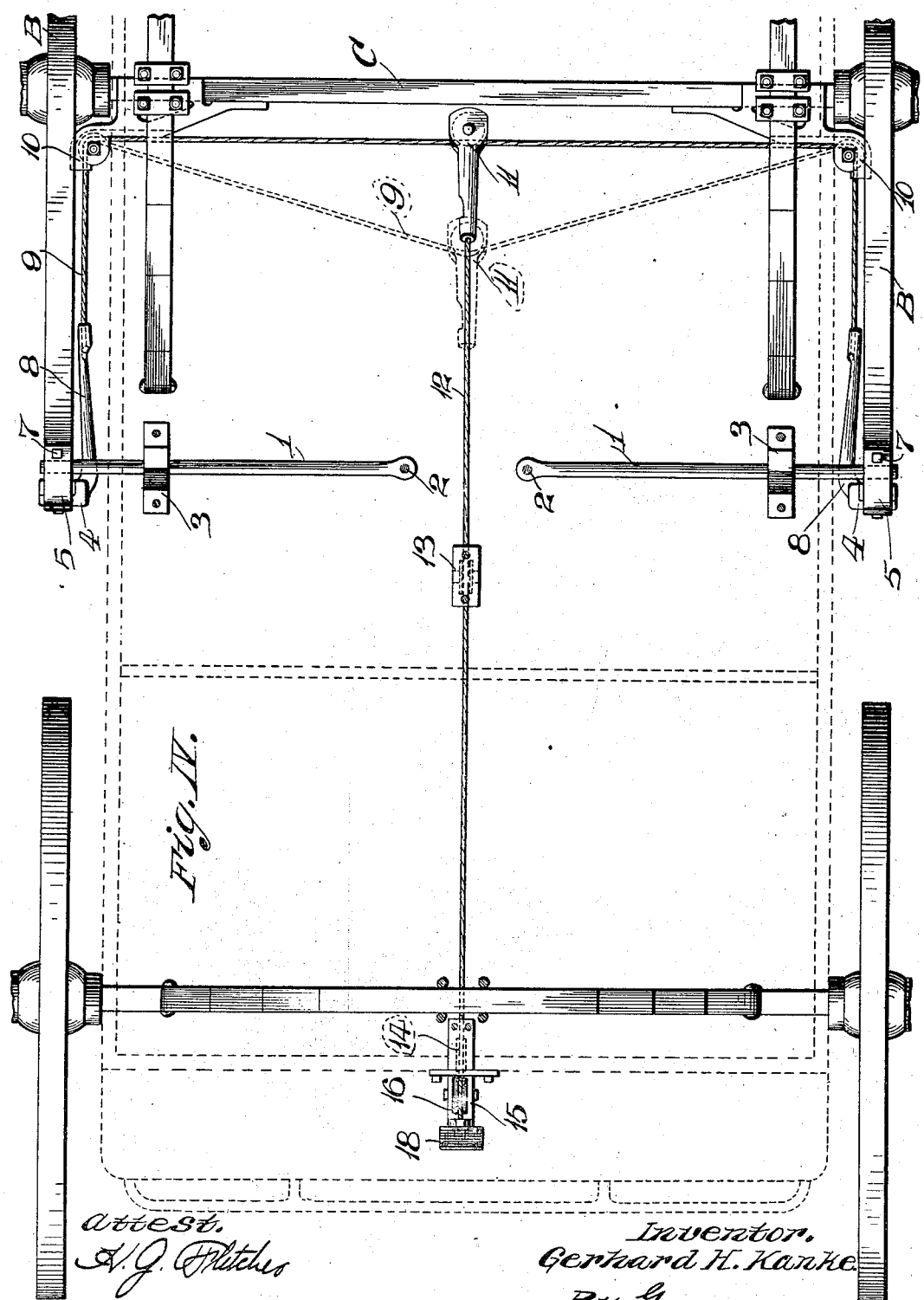

GERHARD H. KANKE, OF ST. LOUIS, MISSOURI.

WAGON-BRAKE.

No. 896,391.   Specification of Letters Patent.   Patented Aug. 18, 1908.

Application filed November 23, 1907. Serial No. 403,454.

*To all whom it may concern:*

Be it known that I, GERHARD H. KANKE, a citizen of the United States of America, residing at the city of St. Louis, in the State of Missouri, have invented certain new and useful Improvements in Wagon-Brakes, of which the following is a full, clear, and exact description, reference being had to the accompanying drawing, forming a part of this specification.

My invention relates to a wagon brake and it has for its object to provide an efficient brake of this construction that may be readily put in service and which contemplates the employment of members that are adjustable relative to each other to provide for variation in the adjustment of the parts and also means whereby compound leverage action is secured in the operation of the brake lever.

Figure I is a side elevation of a part of a wagon with my brake applied thereto. Fig. II is a front elevation of one of the brake heads, the members by which said brake head is supported and the operating members directly associated with the brake head. Fig. III is an enlarged elevation of one of the brake head hangers and the supporting rod to which the hanger is adjustably fitted. Fig. IV is a top or plan view of my brake and the running gear of a wagon.

A designates the body of a wagon and B the rear wheels and C the rear axle of said wagon.

1 designates hanger rods that are supported beneath the wagon body A by bolts 2 that are inserted through bolt holes in the inner ends of the rods and in the bottom of the wagon body and by brackets 3 that are bolted to the bottom of the wagon body. The outer ends of the hanger rods 1 are located in proximity to the rear wheels of the wagon and are grooved longitudinally so as to provide ribs as seen in Figs. I and III.

4 designates brake heads that are suspended in proximity to the tires of the rear wagon wheels by spring hanger arms 5. These hanger arms 5 are secured at their upper ends to split collars 6 which are grooved and ribbed internally so that the collars may be adjustably fitted to the grooved and ribbed outer ends of the hanger rods 1. In each collar 6 is a binding bolt 7 by which the collar may be drawn tightly to the hanger rod after it has been fitted thereto in the desired position. By constructing the parts as just described, provision is made for the adjustment of the brake heads 4 in order that they may be held at any desired distance from the tires of the wagon wheels and the spring hanger arms 5 serve to carry said brake heads away from the tires of the wheels when the brake operating mechanism to be hereinafter described has been released.

Each brake head has secured to it at its inner side a pull arm 8.

9 is a draw rope or flexible draw connection that is united at its ends to the pull arms 8 and which extends rearwardly from said arms toward the rear axle C and then horizontally in a line parallel with said axle. This rope in its course operates in sheave blocks 10 that are suitably attached to the rear axle of the wagon, as seen in Figs. I and IV.

11 designates a pulley block containing a pulley located back of the rear stretch of the rope 9 which extends parallel with the rear axle of the wagon. This pulley block is adapted to be moved forwardly for the purpose of exerting a forward pull at the center of said stretch of rope in order that the brake heads 4 may be drawn toward the tires of the rear wagon wheels.

12 is a pull rope or flexible pull connection that extends forwardly from the pulley block 11 and passes over a pulley in a pulley block 13 that is located beneath the wagon body A near the center thereof and then beneath a pulley in a pulley block 14 that is located beneath the forward end of the wagon body.

15 designates a bracket that is secured to the wagon body at its front end and in which is journaled a sheave 16 on which the rope 12 operates. The bracket 15 is provided at its forward end with a post 17.

18 is a bifurcated operating lever that is pivoted to the bracket 15 at 19 at a point beneath the upper end of the post 17 of said bracket, as seen in Fig. 1.

20 is an auxiliary lever that is pivotally connected to the operating lever 18 above the post 17 of the bracket 15 and which has a lower arm that is located at the rear of said post. The auxiliary lever also has an upper arm to which the forward end of the rope 12 is attached.

In the operation of my brake, the operating lever 18 is moved forwardly and as it is so moved the auxiliary lever 20 is carried forwardly with the operating lever, but its upper arm is caused to move more rapidly than the operating lever, due to the fulcruming of the lower arm of the auxiliary lever on the post 17 of the bracket 15. A compound movement is thus secured which provides for the brake heads being quickly and positively set to the wagon wheels with a minimum expenditure of exertion when the pull rope is drawn forwardly by the levers and a pull is exerted upon the draw rope 9.

1. In a wagon brake, the combination, with a vehicle; of a pair of brake heads adapted to engage the rear wheels thereof, a draw connection attached to said brake heads and extending rearwardly and horizontally parallel with the axle of the rear wheels, means for supporting said draw connection, a pull connection leading forwardly from the middle of said draw connection, an operating lever located at the front of the vehicle, a double-armed auxiliary lever pivoted to said operating lever and to the upper arm of which said pull connection is attached, and a fulcrum member for the operating lever with which the lower arm of said auxiliary lever coöperates when said operating lever is moved, substantailly as set forth.

2. In a wagon brake, the combination, with a vehicle and a pair of brake heads adapted to engage the rear wheels thereof, a draw connection attached to said brake heads, and extending rearwardly and horizontally parallel with the axle of the rear wheels, means for supporting said draw connection from the axle, a pull connection leading forwardly from the middle of said draw connection, an operating lever at the front of the vehicle, a double-armed auxiliary lever pivoted to said operating lever and to one arm of which said pull connection is attached, and a fulcrum member for the operating lever with which the other arm of said auxiliary lever coöperates when said operating lever is moved, substantially as set forth.

3. In a wagon brake, the combination, with a vehicle; of a pair of brake heads adapted to engage the rear wheels thereof, a draw rope attached to said brake heads, and extending rearwardly and horizontally parallel with the axle of the rear wheels, pulley blocks on which said draw rope operates, a pull rope leading forwardly from the middle of said draw rope, an operating lever, located at the front of the vehicle, an auxiliary lever pivoted to said operating lever and to which said pull rope is attached, and a fulcrum member for the operating lever adapted to be engaged by said auxiliary lever when said operating lever is moved, substantially as set forth.

4. In a wagon brake, the combination, with a vehicle; of a pair of brake heads, adapted to engage the rear wheels thereof, a draw rope attached to said brake heads, and extending rearwardly and horizontally parallel with the axle of the rear wheels, pulley blocks in which said draw rope operates, a pull rope leading forwardly from the middle of said draw rope, a bracket provided with a post and suitably supported in front of the vehicle, an operating lever pivoted to said bracket, a double-armed auxiliary lever pivoted to said operating lever; said pull rope being connected to one arm of said auxiliary lever and the other arm of said auxiliary lever being arranged for engagement with said bracket post when said operating lever is moved, substantially as set forth.

GERHARD H. KANKE.

In presence of—
  E. S. KNIGHT,
  BLANCHE HOGAN.